United States Patent

[11] 3,566,907

| [72] | Inventors | Malcolm A. Sime<br>Des Plaines;<br>Carl E. Rudolph, Chicago, Ill. |
|------|-----------|------------------------------------------------------------------|
| [21] | Appl. No. | 819,365 |
| [22] | Filed | Apr. 25, 1969 |
| [45] | Patented | Mar. 2, 1971 |
| [73] | Assignee | Vapor Corporation<br>Chicago, Ill. |

[54] INLINE VALVE POSITION INDICATOR
6 Claims, 10 Drawing Figs.

| [52] | U.S. Cl. | 137/219, 137/553, 137/554 |
|------|----------|---------------------------|
| [51] | Int. Cl. | F16k 37/00 |
| [50] | Field of Search | 137/219, 553, 554, 559 |

[56] References Cited
UNITED STATES PATENTS

| 1,121,969 | 12/1914 | Beling | 137/554X |
| 1,321,751 | 11/1919 | Johnson | 137/553X |
| 1,514,975 | 11/1924 | Larner | 137/553X |
| 2,509,504 | 5/1950 | Jensen | 137/554X |
| 2,652,851 | 9/1953 | Schmidt et al. | 137/553X |
| 3,415,269 | 12/1968 | Salerno | 137/219 |

*Primary Examiner*—M. Cary Nelson
*Assistant Examiner*—Michael O. Sturm
*Attorney*—Norman Aon Witt ABSTRACT: Inline valve position indicator, wherein the valve includes a poppet assembly having a piston and valve closure member driven pneumatically into open position and mechanically into closed position, wherein the position indicator includes a lever extending through the valve body and mounted thereon in pivotal and sealing relation and responsive to the movement of the piston and valve closure member, and wherein the motion of the lever is transmitted externally to actuate a readout means.

INVENTORS
MALCOLM A. SIME
CARL E. RUDOLPH
BY *Warren H Ott*

ATTORNEY

INVENTORS
MALCOLM A. SIME
CARL E. RUDOLPH
BY

ATTORNEY

INVENTORS
MALCOLM A. SIME
CARL E. RUDOLPH
BY
ATTORNEY

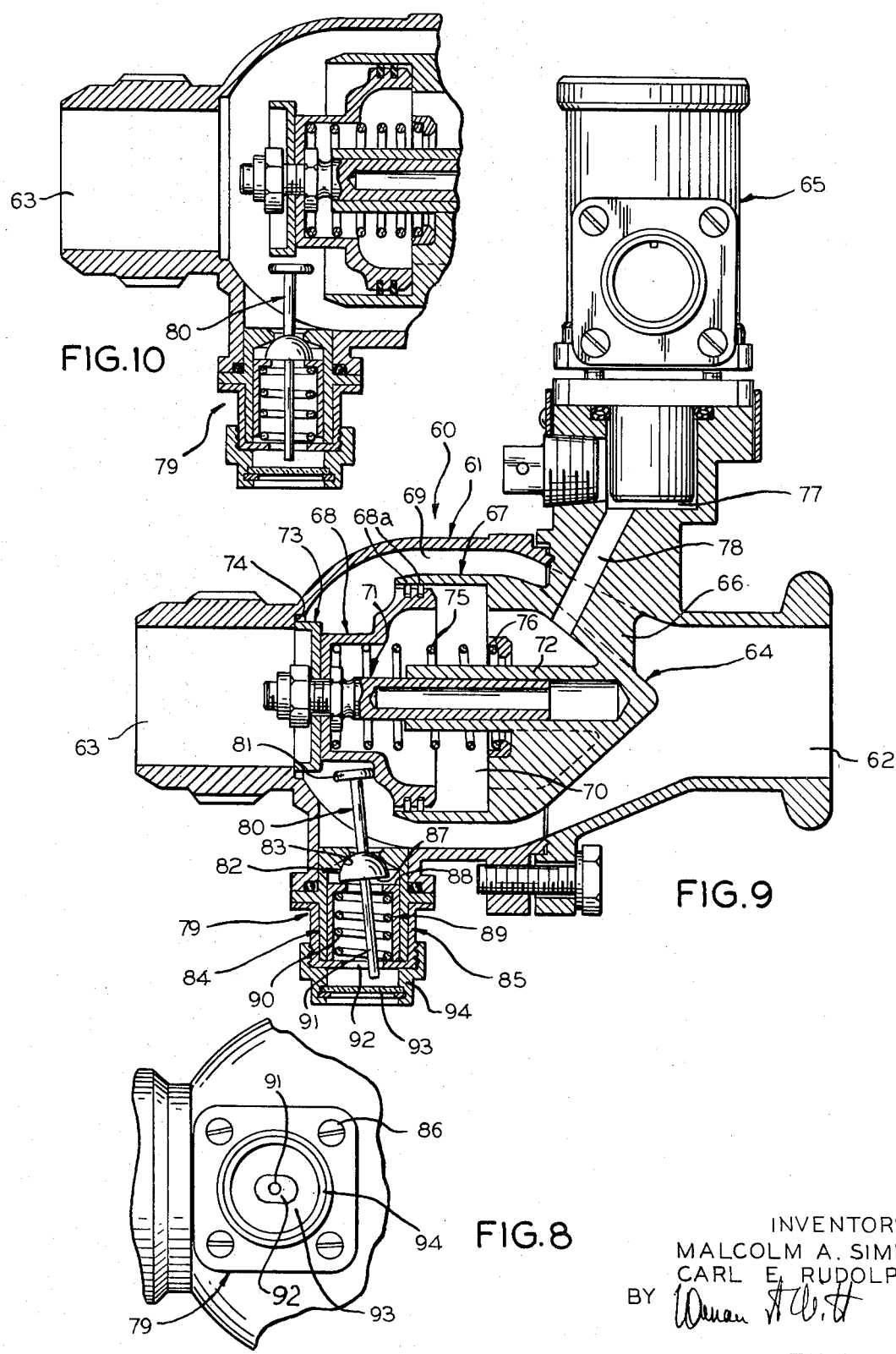

INLINE VALVE POSITION INDICATOR

This invention relates in general to an inline valve for use in controlling fluid flow in a line or conduit, and more particularly to a device for indicating externally of the valve the open or closed condition and dependent upon transmittal of a mechanical movement generated by movement of the valve, and still more particularly to a position indicator for an inline valve that does not exhibit excessive fluid leakage.

With the advent of increased usage of inline valves for controlling fluid flow, and particularly air flow, it has become more desirable to provide a reliable, reasonable priced position indicator. The task of providing a position indicator on a butterfly valve is comparably easy in that the actuating shaft extends externally of the valve body and is therefore readily available to operate tripping switches or the like. However, the problem of providing a position indicator for an inline valve is somewhat more difficult. This problem essentially involves adding of a position indicator to presently existing inline valve having an established reliability history. Modification of such a valve is therefore critically important as it should not comprise reliability in any way. Accordingly, the possibility of providing a poppet-motion-sensing means that would involve mechanical entry into the poppet chamber is ruled out, as the introduction of any possible leakage path from the actuating chamber to atmosphere is totally unacceptable.

The position indicator for inline valves, according to the present invention, includes a lever extending into the interior area of the valve immediately downstream of the poppet-actuating chamber where it is offset by the face of the piston when the vale is in closed position, and returns to a neutral center position when the valve is opened. The motion of the lever is transmitted outside of the valve to a redout means of any desirable form, such as switch operating pilot light indicators or a visually readable position indicator.

Since it is important that leakage from the valve body be maintained at an acceptable level, the manner in which the lever is mounted on the valve body becomes somewhat critical. According to the present invention, a ball swivel arrangement is provided that includes a ball portion on the lever coacting with a socket on the valve body, wherein the ball is spring loaded to move into a neutral center position. Movement of the piston and valve closure member engages the end of the lever to move the lever into an offset position against the spring load. This arrangement maintains leakage through the body around the lever at an acceptable level. The position indicator of the invention is readily adaptable to any size inline valve and could in some cases be incorporated into existing valves by welding or brazing a lever-mounting boss to a valve body.

Accordingly, it is an object of the present invention to provide a position indicator for an inline valve.

Another object of this invention is in the provision of a position indicator for an inline valve that is capable of transmitting movement externally of the valve to a readout device.

A still further object of this invention resides in the provision of an inline valve position indicator including a lever that is mounted on the valve body by a spring-loaded ball swivel arrangement.

Other objects, features and advantaged of the invention will be apparent from the following detailed disclose, taken in conjunction with the accompanying sheets of drawings, wherein like reference numerals refer to like parts, in which:

FIG. 8 is an enlarged fragmentary view of the visual indicating device of the embodiment of FIG. 7 and showing the device where the valve is in open position;

FIG. 9 is a vertical sectional view taken through the valve of FIG. 7 and illustrating the parts of the valve and position indicator in the positions when the valve is closed;

FIG. 10 is a fragmentary sectional view similar to FIG. 9, and illustrating the parts in position when the valve is open.

Figure 1:
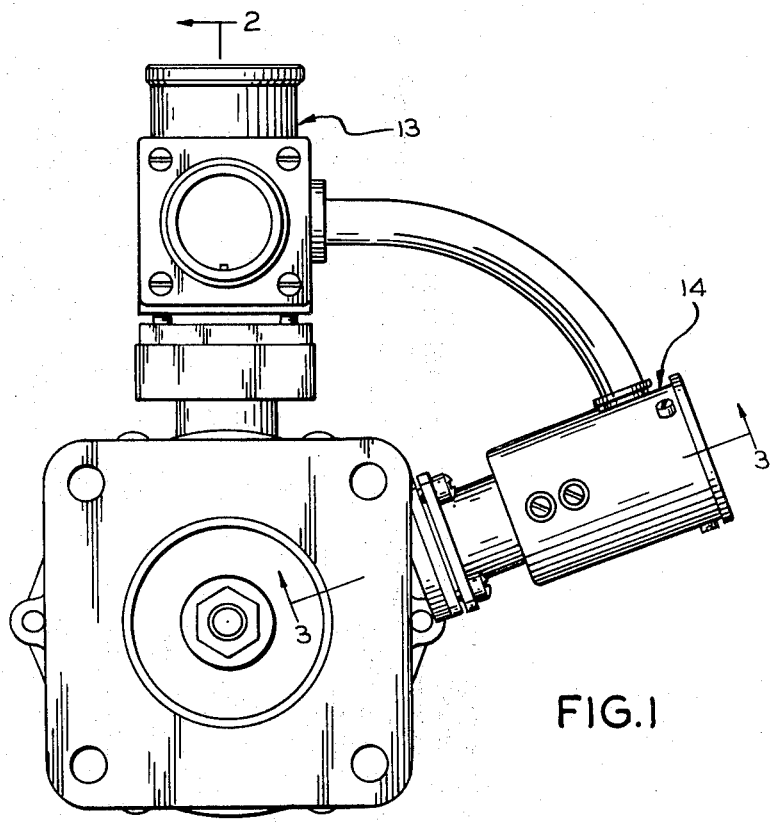
FIG. 1 is a front elevational view of an inline valve having a position indicator mounted thereon in accordance with the present invention.

The position indicator for an inline valve, according to the invention, is first illustrated in FIGS. 1 to 5 where an electrical readout device indicates the open or closed position of the valve. The valve is generally indicated by the numeral 10, and includes a general cylindrical body or shell 11 having a poppet control housing 12 mounted therein, operated by a solenoid valve 13 mounted on the body 11.

A valve position indicator, generally indicated by the numeral 14 indicates the open or closed position of the valve.

The body 11 of the inline valve 10 includes an inlet 15, and an outlet 16 coaxially aligned herewith, and between which the poppet control housing 12 is mounted. It should be appreciated that the position indicator 14 may be used with other types of inline valve.

The poppet control housing 12 is suspended within the body 11 by a plurality of webs or arms 17, and includes a cylinder 18 closed at the end facing the inlet and open at the end facing the outlet.

The cylinder 18 slidably receives a piston 19 that moves coaxially within the cylinder 18. A shaft 20 is suitably secured to the piston 19 and slidably and guideably received in a blind bore or guideway 21 formed in the closed end of the cylinder A closure disc 22 is also secured to the shaft 20 and the piston 19 for coaction with a valve seat 23 formed at the outlet 16. Accordingly, the piston 19, shaft 20 and closure disc 22 defines an assembly that is essentially unitary, and which comprises a poppet assembly for controlling fluid flow through the valve 10.

An annular passageway 24 is defined between the cylinder 18 and the body 11 and which intercommunicates the inlet 15 and the valve seat 23. When the valve assembly 19, 20 and 22 is in open position, the passageway 24 defines the intercommunicating path between the inlet 15 and the outlet 16. It should be appreciated that the inlet and outlet will be suitably connected to ductwork in a fluid flow system, wherein the vale 10 controls the fluid flow in the system.

Figure 2:
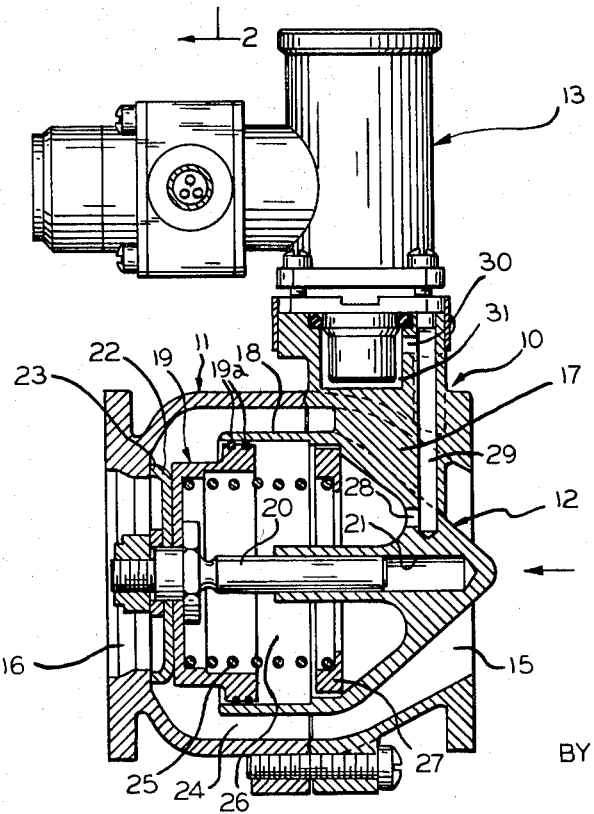
FIG. 2 is a vertical sectional view taken along the valve of FIG. 1 substantially along line 2–2 thereof, with some parts shown in full view and illustrating the valve in closed position.

The valve assembly 19, 20, and 22 when in closed position as shown in FIG. 2 is maintained in closed position by the closing spring 25 and the pressure in the actuating chamber 26. One end of the closing spring 25 is bottomed on the piston 19, while the other end is bottomed on a spring seat 27 fitted within the cylinder 18.

Control of the pressure within the chamber 26 is accomplished by the solenoid valve 13, which when energized, connects the actuating chamber 26 to atmosphere. Interconnecting passageways 28, 29 and 30 continually interconnect the actuating chamber 26 with a chamber 31 in the solenoid valve assembly, the latter of which is selectively connected to atmosphere by operation of the solenoid valve 13.

To open the valve 10, the solenoid valve 13 is energized thereby interconnecting the actuating chamber 26 with the atmosphere. This causes great reduction in the pressure in the actuating chamber because the rate of air bled past the piston rings 19a of the piston 19 is small compared to that permitted to escape the atmosphere. The resultant pressure force acts on the piston 19 to move it in the opening direction. This resultant force is equal to the difference between the inlet and actuating chamber pressures times the difference between the piston actuating chamber area and the piston disc area, which force is great enough to overcome the force of closing spring 25 and all frictional forces to drive the valve assembly 19, 20, and 22 toward the inlet end and to open position. The valve will remain open as long as the actuating chamber 26 is vented to atmosphere.

To close the valve, the control passage operated by the solenoid valve is closed by deenergizing the solenoid valve thereby cutting off the venting of the actuating chamber 26 to the atmosphere. This permits the pressure in the actuating chamber to increase due to the air bleeding past the piston rings 19a *until the pressure in the actuating chamber reaches the inlet pressure level. When the pressure on both sides of the piston 19 have equalized the spring 25 takes over and its force closes the valve by driving the valve assembly 19, 20 and 22 toward the outlet 16 and into closed position where the closure disc 22 seats on the valve seat 23.*

Figure 3:
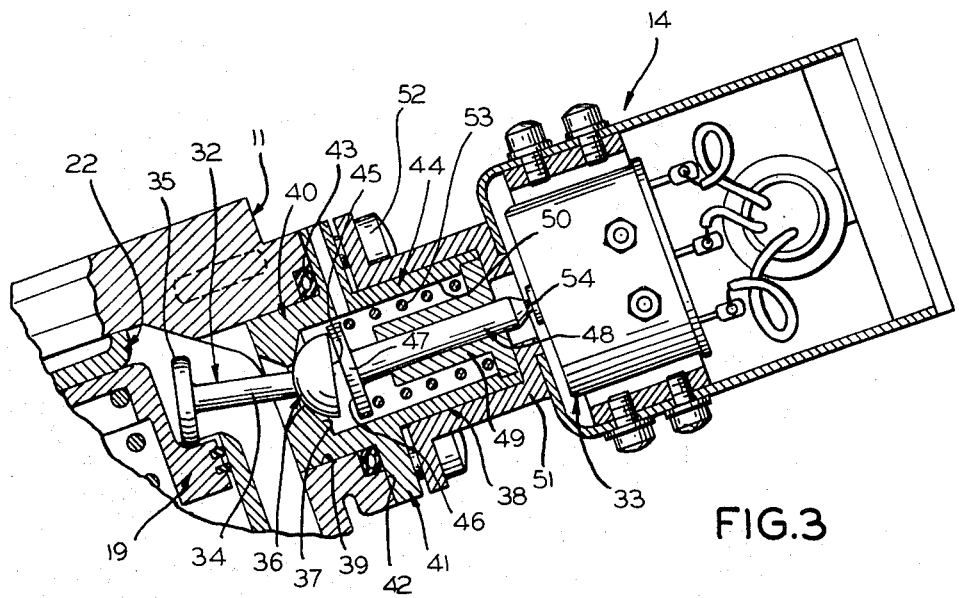
FIG. 3 is an enlarged fragmentary sectional view taken substantially along line 3–3 of FIG. 1 illustrating the position indicator of the invention with the parts in position when the valve is closed.
Figure 4:
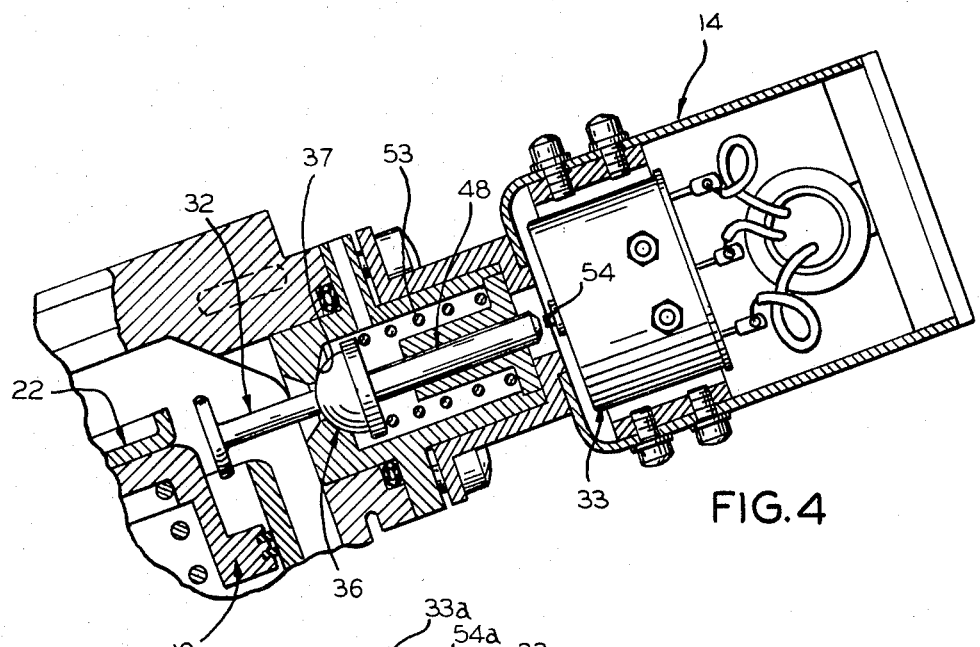
FIG. 4 is a view similar to FIG. 3 with the parts shown in position when the valve is open.

The position indicator 14, FIGS. 3 and 4, is mounted on the valve body 11, and generally includes a lever 32 extending within the valve body 11 and into engagement with the valve piston 19, and an electric switch 33 reading out the position of the lever 32.

A lever 32 includes a stem 34 having a disc-shaped head 35 at one end engaging the valve piston 19, and a semispherical head 36 at the other end pivotally carried in a socket 37 of a fitting 38 mounted on the body 11. The semispherical head 36 and the socket 37 essentially define a ball-swivel arrangement. A bore 39 is defined in the valve body 11 for receiving the inner cylindrical end 40 of the fitting 38. A radially extending flange 41 extends from the fitting 38 and bears against a seating surface 42 on the valve body, and a gasket 43 is provided between the body and fitting to define a sealing relationship. Extending coaxially with the cylindrical end 40 of the fitting 38 and on the other side of the flange 41 is the cylindrical end 44.

Movement of the lever 32 is transmitted by a flat surface 45 on the ball head 36 to a flat surface 46 of a disc-shaped flange 47 carried on one end of a plunger 48 which is slidably received in a guide 49 extending within a bore 50 formed in the fitting 38.

The guide 49 is flanged at one end and seated on a shoulder formed on the fitting 38 and held in place by a cover member 51, that is, in turn, secured to a valve body by fasteners 52 which likewise secure in place the fitting 38. Spring 53 biases the plunger 48 against the ball head 36 of the lever 32. The spring is bottomed on one end at the flanged end of the guide 49 and at the other end on the flange 47 of the plunger.

Figure 5:
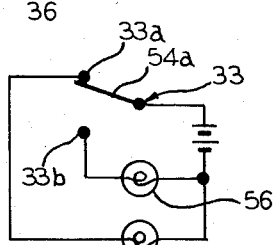
FIG. 5 is a schematic electrical diagram illustrating the position indicator switch in the embodiment of FIGS. 1 to 4 in a circuit with pilot lights.
Figure 7:
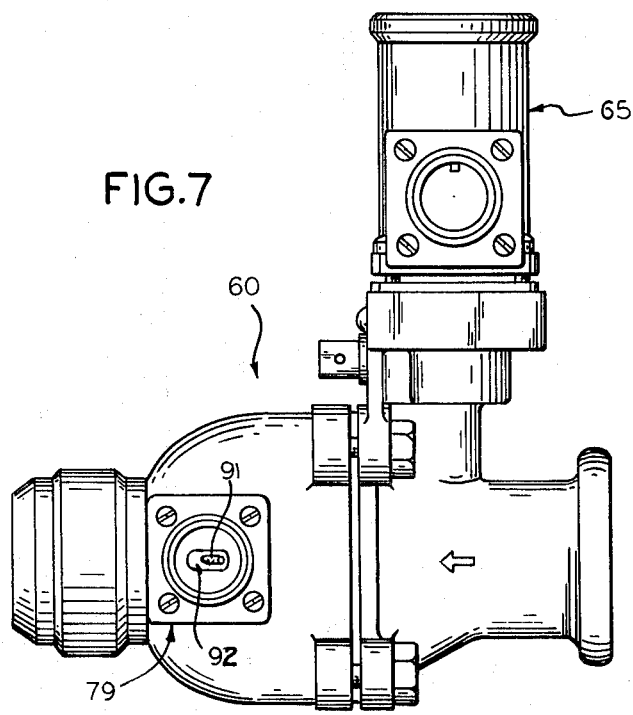
FIG. 7 is a side elevational view of the valve of FIG. 6 and illustrating the visual readout device of the position indicator as showing the valve in closed position.
Figure 6:
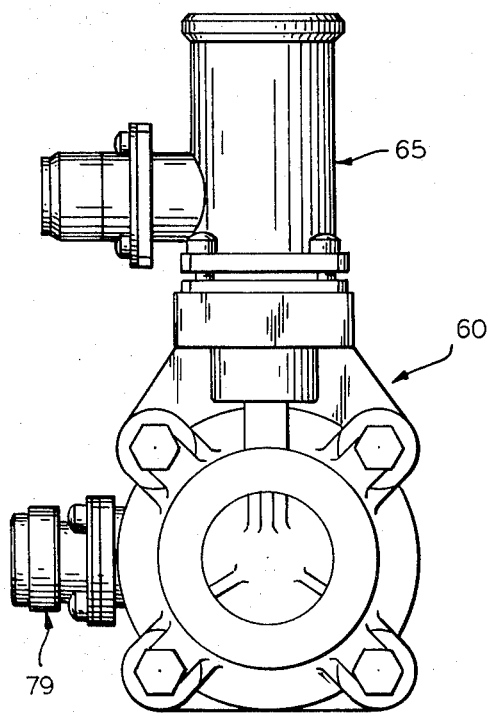
FIG. 6 is a front elevational view of a valve having a modified position indicator according to the invention.

The top end of the plunger 48 engages a switch pin 54 of the switch 33, where depressing and releasing of the switch pin conditions the switch 33 to operate a pilot pilot light circuit such as shown in FIG. 5. Operation of the switch pin 54 moves the switch arm 54a *to engage either the contact 33a* or the contact 33b for selectively energizing the pilot light 55 or the pilot light 56 to indicate whether the valve is in open or closed position.

As shown in FIG. 3, when the piston 19 and valve closure disc 22 are in the closed position, it causes tilting of the lever 32 and subsequent depressing of the plunger 48 against the force of spring 53 which, in turn, depresses the switch pin 54 to condition the switch 33 and the pilot light circuit and indicate the valve to be in closed position by energizing the closed position pilot lamp. Opening of the valve piston 19 and the valve disc 22 as shown in FIG. 4 allow the lever 32 to obtain a neutral position and thereby permit the plunger 48 to move toward the lever 32 and allow the switch pin 54 to retract and change the position of the switch arm 54a to cause the other pilot light to be energized and indicate the valve to be in open position.

The ball-swivel arrangement of the lever 32 which transmits the movement of the valve piston exteriorly of the valve body is such as to minimize leakage of air from the valve body by virtue of the sealing engagement between the ball-shaped head 36 and the socket 37. The spring 53 maintains the ball-shaped head 36 under pressure and in sealing engagement with the socket 37. Accordingly, the position indicator 14 enables the determination of the position of the valve closure member and valve piston while eliminating the possibility of excessive leakage of fluid from within the valve.

A modification of the invention is illustrated in FIGS. 6—10, wherein the readout means of the position indicator presents a visual signal. It can also be appreciated that the configuration of the inline valve is somewhat different from that shown in the embodiment of FIGS. 1—5 and as already stated, the position indicator is intended for use on any type of inline poppet valve. The valve in this embodiment is generally indicated by the numeral 60, and as seen in FIG. 9, includes a tubular body or shell 61 having an inlet 62 and an outlet 63 coaxial with the inlet. A poppet control housing 64 is mounted within the valve body between the inlet and outlet to control the fluid flow through the valve. Control of the poppet is accomplished by the solenoid valve 65 and in a manner hereinafter described and in the same manner as in the first embodiment.

The poppet control housing 64 is suitably supported within the valve body 61 by one or more hangers or arms 66, and includes a cylinder 67 slidably receiving a valve piston 68. The cylinder 67 is closed at the end adjacent the inlet 62 and open at the end adjacent the outlet 63 to receive the piston 68. The size of the cylinder is such that it is smaller than the valve body 61 and defines therewith an annular passageway 69 which provides intercommunication between the inlet and the outlet. Piston rings 68a are received on the piston 68 to sealingly engage the cylinder 67 and define within the poppet an actuating chamber 70. The piston 68 is guideably supported by the cylinder 67 in that a shaft 71 is secured centrally of the piston and slidably received by a guide 72 integrally formed in the cylinder 67 and extending from the closed end thereof. A valve closure disc 73 is also secured to the valve piston 68 and coacts with a valve seat 74 formed at the outlet 63. Accordingly, the valve piston 68, shaft 71 and closure disc 73 move together as a unit during opening and closing of the valve. The piston 68 and closure disc 73 are continually biased toward the outlet by a spring 75 bottomed at one end on the valve piston and at the other end on the spring seat 76 bearing against the closed end of the cylinder 67.

Opening and closing of the valve is controlled by the solenoid valve 65 which selectively vents the actuating chamber 70 to atmosphere. This chamber is connected to a solenoid valve chamber 77 by a passageway 78. The opening and closing operation of the valve is identical to the opening and closing operation of valve 10 in the first embodiment wherein operation of the solenoid valve 65 to vent the actuating chamber 70 to atmosphere causes movement of the valve piston 68 and valve closure disc 73 toward the inlet end of the valve. Conditioning of the solenoid vale 65 to close the actuating chamber 70 to atmosphere causes closing of the valve and the movement of the valve piston 68 and closure disc 73 toward the outlet 63 until the valve closure disc 73 seats on the valve seat 74. Accordingly, the operation of the valve is identical to the operation of the valve 10 which has been heretofore explained.

The position indicator 79 includes a motion transmitting lever 80 extending into the valve body 61 and having a flanged head 81 engageable with the piston 19. A semispherical head 82 is provided on the lever 80 for coaction with a socket 83 formed in a fitting 84 that is mounted on the body 61. Therefore, a ball swivel arrangement is defined between the motion transmitting lever 80 and the valve housing 61. A cover member 85 fits over the fitting 84 and secures it in place on the valve body in sealing relation therewith by a plurality of fasteners 86.

A flat surface 87 is defined on the ball head 82 for coaction with the flanged end in of a guide member 89 which is biased against the flat surface 8 of the head 82 by a spring 90. The guide member 89 is guidably received within the fitting 84. One end of the spring 90 is bottomed on an end flange of the guide member, while the other end is bottomed on the cover member 85.

An indicator pin 91 is integral with the lever 80 and extends from the flat surface 87 in coaxial arrangement with the lever, and through an opening 92 formed in the cover member 85. A transparent window 93 is supported by a frame 94 threadedly received on the cover member 85 at the outer end of the position indicator 79. The transparent window 93 as shown in FIG. 8 in the form of an elongated slot, and when the indicator pin 91 is in the center or neutral position as shown, the valve is in the open position inasmuch as the guide member 89 and spring 90 force the lever to the neutral position shown in FIG. 10 when no force is applied to the inner end of the lever. As the valve closes, the piston engages the inner end of the lever 80 and drives it to an offset position as shown in FIG. 9, and the pin 91 will take the position illustrated in FIG. 7. Accordingly a visual watch of the window 93 indicates whether the valve is in open or closed position.

It will be understood that modifications and variations may be effected without departing from the scope of the novel concepts of the present invention.

We claim:

1. An inline valve comprising a tubular body having an inlet at one end and an outlet at the other end in alignment therewith, a valve seat at the outlet, a cylinder supported in said body between the inlet and valve seat being closed at the end adjacent the inlet and open at the end adjacent the outlet and defining with said body a fluid passageway between the inlet and outlet, piston slidably received in said cylinder, valve closure means on said piston coacting with said valve seat and movable with said piston between open and closed positions, means including an actuating chamber in said cylinder for causing movement of said piston, valve-position-indicating means responsive to movement of said valve closure means and piston for indicating the position of the valve closure means exteriorly of said valve body, said valve-position-indicating means including an operating lever, spring-loaded ball swivel means for mounting said operating lever on said valve body with the lever extending into the valve downstream of the actuating chamber and into the path of the piston, and readout means receiving the motion of the lever as it is moved by the piston during opening and closing of the valve, wherein said spring loaded ball swivel means seals against leakage.

2. An inline valve as defined in claim 4, wherein said readout means includes an electric switch and pilot light indicators operable thereby.

3. An inline valve comprising a tubular body having an inlet at one end and an outlet at the other end in alignment therewith, a valve seat at the outlet, a coaxially mounted poppet in said body including a piston having a valve disc that coacts with said valve seat to open and close the valve, said poppet having means for pneumatically driving the piston and disc to a position opening the valve and mechanically driving the piston and disc to a position closing the valve, and position-indicating means outside of the valve body for indicating the position of said valve disc relative the valve seat and being responsive to movement of the piston and disc, said position-indicating means including a lever extending through the body with the inner end engaging and movable with the valve piston, a ball socket in the valve body through which the lever extends, ball-shaped means on said lever engaging said ball socket, and means biasing said ball-shaped means into sealing engagement with said socket and towards a neutral position.

4. An inline valve as defined in claim 3, and readout means responding to the movement of said lever.

5. An inline valve as defined in claim 4, wherein said readout means includes reference means and indicator means movable relative thereto.

6. An inline valve comprising a tubular body having an inlet at one end an outlet at the other end in alignment therewith, a valve seat at the outlet, a cylinder supported in said body between the inlet and valve seat being closed at the end adjacent the inlet and open at the end adjacent the outlet and defining with said body a fluid passageway between the inlet and outlet, a piston slidably received in said cylinder, valve closure means on said piston coacting with said valve seat and movable with said piston between open and closed positions, means including an actuating chamber in said cylinder for causing movement of said piston, valve position indicating means responsive to movement of said valve closure means and piston for indicating the position of the valve closure means exteriorly of said valve body, said valve position indicating means including a ball socket in the valve body, a hole in the center of the socket, a lever extending through said hole and into the path of movement of said piston, ball shaped means on said lever in coacting sealing engagement with said socket, spring means loading said lever to normally drive it to a neutral center position, whereby movement of said piston and valve closure means to closed position causes the lever to offset against the force of the spring means, and means reading out the position of the lever thereby reading out the position of the valve. 0010 76 indicator 117 comprise 139